United States Patent [19]

Vanderhoek et al.

[11] E Patent Number: Re. 32,203

[45] Reissued Date of Patent: Jul. 15, 1986

[54] PULPING WITH QUINONES AND HYDROQUINONES

[75] Inventors: Naphtali N. Vanderhoek, Doncaster; Peter F. Nelson, Kew; Alan Farrington, Surrey Hills, all of Australia

[73] Assignee: Australian Paper Manufacturers Limited, South Melbourne, Australia

[21] Appl. No.: 664,226

[22] Filed: Oct. 24, 1984

Related U.S. Patent Documents

Reissue of:

[64] Patent No.: 4,213,821
Issued: Jul. 22, 1980
Appl. No.: 800,566
Filed: May 25, 1977

U.S. Applications:

[63] Continuation of Ser. No. 505,739, Jun. 20, 1983, abandoned.

[30] Foreign Application Priority Data

| | | | |
|---|---|---|---|
| Jun. 2, 1976 | [AU] | Australia | PC6141 |
| Sep. 23, 1976 | [AU] | Australia | PC7473 |
| Dec. 13, 1976 | [AU] | Australia | PC8455 |

[51] Int. Cl.[4] ..... D21C 3/02; D21C 3/22

[52] U.S. Cl. ..... 162/72; 162/83; 162/90

[58] Field of Search ..... 162/17, 19, 70, 72, 162/79, 80, 83, 84, 86, 90; 260/351, 369, 396 R

[56] References Cited

U.S. PATENT DOCUMENTS

| | | | |
|---|---|---|---|
| 2,192,202 | 3/1940 | Peterson et al. | 162/72 X |
| 2,218,479 | 10/1940 | Peterson et al. | 162/72 X |
| 2,883,826 | 4/1959 | Wayzata et al. | 162/83 X |
| 2,920,010 | 1/1960 | Voiret | 162/83 X |
| 3,888,727 | 6/1975 | Kenig | 162/65 |
| 4,012,280 | 3/1977 | Holton | 162/72 X |

FOREIGN PATENT DOCUMENTS

| | | | |
|---|---|---|---|
| 98549 | 6/1973 | German Democratic Rep. | 162/72 |
| 51-43403 | 4/1976 | Japan | 162/72 |
| 51-112903 | 10/1976 | Japan | 162/72 |
| 75112938 | 5/1976 | Sweden . | |

OTHER PUBLICATIONS

Bach et al., "New Possibilities for Carbohydrate Stabilization in Alkaline Cooking", Zellstaff und Papier, (i) 3 (1972); 162–72.

Rydholm "Pulping Processes", Interscience Publishers, (1965) pp. 92, 94, 422–438, 439–440, 614, 628–629.

*Primary Examiner*—Arthur L. Corbin

*Attorney, Agent, or Firm*—Bucknam and Archer

[57] ABSTRACT

A process for the delignification of *softwood* lignocellulosic material is described wherein the lignocellulosic material is cooked with [an alkaline or] *a* neutral sulphite pulping liquor, and there is added to the pulping liquor at least 0.001% by weight of an additive compound or mixture of additive compounds selected from quinones and hydroquinones.

13 Claims, No Drawings

PULPING WITH QUINONES AND HYDROQUINONES

Matter enclosed in heavy brackets [ ] appears in the original patent but forms no part of this reissue specification; matter printed in italics indicates the additions made by reissue.

*This is a continuation of application Ser. No. 505,739, filed June 20, 1983, abandoned.*

The present invention relates to cellulosic pulp processes, in particular, alkaline and neutral pulping processes of the type used for the production of cellulosic pulps used in the manufacture of paper or paperboard. These processes include the kraft, soda and soda-oxygen processes as well as processes for the production of high yield semichemical type pulps such as high yield soda processes and the neutral sulphite semichemical (NSSC) process.

Alkaline pulping processes are well known and numerous methods having been proposed for increasing the yield of such processes. Such methods have included using compounds such as hydrazine, hydroxylamine, sodium borohydride, sodium polysulphides and hydrogen sulphide in the pulping liquors or in a pretreatment stage. These materials suffer from various disadvantages in that they are not stable at high temperatures, are expensive, involve the build-up of inorganic elements such as boron in the system, or involve the use of sulphur compounds leading to the possibility of environmental pollution.

Certain cyclic keto compounds have recently been identified as stabilising the cellulosic raw material against alkaline degradation and increasing pulp yields. Bach and Fiehn (Zellstoff und Papier (1) 3 (1972) and East German Pat. No. 98,549) have disclosed the usefulness of anthraquinone monosulphonate sodium salt (AMS) for stabilising celluloses and increasing pulp yield in soda and kraft pulping. More recently, U.S. Pat. No. 3,888,727 (Australian Patent Application No. 68290/72) issued to Kenig, disclosed the use of the sodium salt of anthraquinone monosulphonate (AMS) in the soda stage of a soda-oxygen pulping process.

Although soluble in caustic soda, AMS, in being a sulphur-containing compound, suffers from the disadvantage that it may cause environmental pollution problems, whereas the parent compound, anthraquinone, although sulphur-free, is insoluble in caustic soda.

One object of the present invention is to provide an improved alkaline pulping process for use in the manufacture of paper or paperboard, in which certain quinone or hydroquinone compounds or derivatives are used which are soluble in the alkaline pulping liquor, so that they can be more readily and effectively introduced into the pulping system and are remarkably effective in increasing the rate at which delignification of the lignocellulosic raw material takes place, when compared with conventional pulping procedures of a generally similar nature.

Another object of the present invention is to provide a pretreatment stage in the alkaline pulping process of the invention, in which the lignocellulosic raw material is impregnated with cooking chemicals including said quinone or hydroquinone compounds or derivatives in order to enhance the penetration of such chemicals into the lignocellulosic raw material before being introduced into a digester for delignification cooking. Pre-treatment or impregnation of such material is virtually impossible with sparingly soluble solid. Hence the process of the invention has an added advantage in that regard and in particular with semichemical pulping processes.

In accordance with the present invention there is provided a process for the delignification of lignocellulosic material wherein the lignocellulosic material is cooked with an alkaline, neutral sulphite pulping liquor the improvement comprising the addition to the pulping liquor of at least 0.001% by weight of an additive compound or mixture of additive compounds selected from anthraquinones, phenanthrene quinones, naphthoquinones, anthrones, benzoquinones, anthrahydroquinones, napthohydroquinones, phenanthrahydroquinones, benzohydroquinones or the alkyl-, alkoxy-, hydroxy-, amino-, halo- or carboxy- derivatives of said quinones or hydroquinones and the tautomeric forms of said quinones or hydroquinones, where the pulping liquor is neutral sulphite and from amino and hydroxy derivatives of anthraquinones, phenanthraquinones, napthoquinones, anthrones and benzoquinones and anthrahydroquinones, napthohydroquinones, phenanthrahydroquinones, benzohydroquinones or the alkyl-, alkoxy-, halo-, hydroxy-, amino-, or carboxy- derivatives of said hydroquinones and the tautomeric form of said hydroquinones, when the pulping liquor is alkaline.

Throughout this specification an alkaline pulping liquor is defined as a pulping liquor containing bases such as sodium hydroxide, potassium hydroxide, ammonium hydroxide, calcium hydroxide, magnesium hydroxide and includes pulping liquors used in the kraft or modified kraft process, the soda process soda-oxygen process, sodium carbonate or sodium hydroxide-sodium carbonate process.

The quinone compounds used in this invention include, anthraquinone, 1- and 2-alkylanthraquinones wherein alkyl is $C_{1-7}$, 1- and 2-aminoanthraquinones, 1- and 2-halo or hydroxyanthraquinones and the corresponding benzoquinones, napthoquinones and phenanthraquinones, for example 5-hydroxy napthoquinone.

Hydroquinone compounds used in the process of the invention can be selected from 9,10-anthrahydroquinone, 1- and 2-alkyl-9,10-anthrahydroquinones (e.g. alkyl groups of $C_{1-7}$, particularly 2-ethyl and 2-tert.butyl anthraquinone), 1- and 2-alkoxy-9,10-anthrahydroquinones (e.g. alkoxy groups of $C_{1-7}$), 1- and 2-amino-9,10-anthrahydroquinones, 1- and 2-hydroxy-9,10-anthrahydroquinones, 1- and 2-halo-9,10-anthrahydroquinones, and mixtures of any of said anthrahydroquinone compounds. Tautomeric compounds can be selected from 10- hydroxyanthrone, 1- and 2-alkyl-10-hydroxyanthrones, 1- and 2-alkoxy-10-hydroxyanthrones, 1- and 2-amino-10-hydroxyanthrones, 1- and 2-hydroxy-10-hydroxyanthrones, 1- and 2-halo-10-hydroxyanthrones, and mixtures of any of said anthrone compounds.

Hydroxy-substituted quinone or hydroquinone compounds used in the process of the invention can be selected from mono-, di-, tri and tetra-hydroxy-substituted benzoquinones or napthoquinones or anthraquinones or phenanthraquinones, or, mono-, di-, tri- and tetra-hydroxy-substituted benzohydroquinones or naphthohydroquinones or phenanthrahydroquinones.

A wide variety of lignocellulosic raw materials may be used in carrying out the process of the invention. By way of example, suitable lignocellulosic raw materials for the pulp include softwood chips, hardwood chips, whole tree chips from softwood or hardwood trees, sawdust and non-woody cellulosic raw materials such as bagasse (sugar cane residues), kenaf, straw and other annual plants and crops. Whole tree chips include chips from various parts of a tree including the bark, branches, leaves and roots. These raw materials may be pulped in accordance with the invention by utilizing procedures which involve one or more stages, whether carried out by batch or continuous operation. The process of the invention may also be applied to pulping procedures whether conducted in aqueous solution or in other solvents.

The amount of quinone or hydroquinone or substituted quinone or hydroquinone compound required for delignification of the lignocellulosic raw material in accordance with the invention may vary considerably, depending to a substantial extent on the particular process to be used. Generally the presence of a relatively small quantity, for example, from 0.001 to 10% by weight, based on the oven dry lignocellulosic raw material, is sufficient. Preferably, the quinone or hydroquinone compound or derivative is employed in an amount of from 0.001 to 0.5% and more preferably about 0.1–0.3% by weight as indicated.

In practising the process of the present invention, the hydroquinone compound(s) or tautomers or derivatives may be generated in situ by reaction of the corresponding quinone compound(s) with a reducing agent in a solution which is added to the pulping liquor or which is subsequently used as the pulping liquor. Inorganic or organic reducing agents may be used for the purpose, with a preference for organic compounds or compositions.

Inorganic reducing agents which may be so used include sodium or zinc dithionite (hydrosulphite), sodium borohydride, or zinc powder and sodium hydroxide. Organic reducing agents, which it is preferred to use, include carbohydrates such as glucose, xylose, mannose, or other monosaccharides, sucrose, cellobiose, maltose, or other disaccharides, olignosaccharides such as raffinose, or polysaccharides such as starch or xylan; amines or alkanolamines, such as ethylene diamine or diethylene triamine or ethanolamines; or aldehydes such as formaldehyde, acetaldehyde or vanillin; or spent cooking liquor; or liquor withdrawn from a cook after an appreciable dissolution of reducing substances has occurred, that is, at some point in the temperature range 100°–170° and preferably in the range 120°–140° C., which in practice can be achieved: (a) in batch cooking, by draining some cooking liquor at the required temperature in the range 100°–170° C. and recycling this to the impregnation stage of the next cook; or (b) in batch cooking, by re-use of black liquor obtained at the end of a cook, or at the end of one or more stages of a cook involving two or more stages, in the succeeding cook or in one or more stages of a succeeding cook of two or more stages; or (c) in continuous cooking, by draining some cooking liquor from a point close to the top of the continuous digester and recycling this to a continuous impregnation stage.

Reducing agents present in the cooking liquor may in some cases become exhausted or destroyed as the cooking process proceeds, resulting in the reducing effect being substantially diminished or entirely lost. We have found that in such cases it is advantageous to add increments of the reducing agent periodically by injection into the lignocellulosic cooking digester in order to maintain a sufficient amount of the hydroquinone or hydroxyquinone compound in the cooking liquor throughout the cooking period.

Cooking of the lignocellulosic raw material for delignification in accordance with the process of the invention may be varied to suit the requirements of the particular process selected for the purpose. However, addition of 0.001% to 10% by weight of the additives and a cooking temperature of 50° to 250° C. for 0.5 to 480 minutes are the general process parameters. The quinone or hydroquinone compound or derivative may be pre-mixed with the cooking liquor and the lignocellulosic raw material before addition to the cooking digester for cooking under variable conditions; or said compound may be added directly to the cooking liquor and lignocellulosic raw material in the digester, either in a single charge or in several charges at different stages of the digestion or continuously throughout the digestion.

Operating under kraft or soda or soda-oxygen or other conventional alkaline pulping conditions, the cooking temperature may be in the range of 50°–250° C. the preferred range being 130° C. to 180° C. and the cooking period may be in the range of 0.5 to 480 minutes. The overall cooking period/cooking temperature may consist of a first stage of 30 minutes to 120 minutes in reaching a temperature of 100° to 120° C.; a second stage of 15 minutes to 60 minutes held at the temperature of 100° to 130° C.; and a third stage of 30 minutes to 300 minutes at a temperature from the 130° to a maximum temperature of 180° C. The result is an enhanced rate of delignification of the cellulosic raw material and a pulp having excellent properties, in particular, a high strength pulp in good yield.

For some purposes, such as the manufacture of corrugating paper and some component pulps for linerboards, the high strengths obtainable with kraft pulping are not necessary and the relatively low yield and consequent high cost of kraft pulps is a disadvantage. Accordingly, variants such as "high yield kraft" and various sulphite processes have been recommended and used for these purposes. The most widely applied of these higher yield processes is the so-called neutral sulphite semichemical (NSSC) process in which wood is cooked with a solution of sodium sulphite containing sodium carbonate or sodium bicarbonate and which is capable of giving pulps with yields in the range 65–85% and with properties suitable for use as the principle component in the manufacture of corrugating paper and as an important component of linerboards and bag and wrapping papers.

NSSC pulps obtained by the process of the invention have strengths equal to, or better than, those of conventional NSSC pulps. Moreover the cooking time is markedly reduced, with consequent increase in effective digester capacity, saving in energy, and improvement in colour of the pulp. Alternatively, the cooking time may be held substantially constant at the usual level for NSSC pulps and a reduced cooking temperature employed, or another combination of time and temperature selected which represents an advantage over the normal procedure for NSSC pulps.

The present invention is particularly applicable to softwood NSSC pulps such as those prepared from pines, e.g. P. radiata. NSSC pulps are not normally manufactured from softwoods due in part to the long cooking times required of 3–5 hours at 180° C. The present invention allows the cooking time in such a process to be approximately halved.

The increasing stringency of environmental standards has placed greater emphasis on the need for chemical recovery systems which will allow recovery of the pulping chemicals and destruction of dissolved wood substances which could otherwise impose an undesirable burden on the environment. This applies particularly to NSSC pulping, in which recovery processes are complex and expensive.

Another aspect of this invention provides improved sulphur free pulping processes in which addition of small amounts of the quinone or hydroquinone compounds or derivatives improves the pulping rate and the quality of the pulps.

The absence of sulphur compounds in the process of the invention means not only that the objectionable odours often associated with the presence of such compounds in a recovery system are eliminated, but that relatively simple recovery systems are applicable. Apart from the normal recovery furnace, suitable systems which may be mentioned include fluidized bed combustion and wet combustion.

As noted above, pretreatment of the cellulosic raw material in a soaking liquor containing the quinone or hydroquinone compounds or derivatives for a preliminary impregnation of the cellulosic raw material with said compounds may be carried out before the introduction of the cellulosic raw material into a digester for completion of the delignification process. This pretreatment or preparatory pulping of the lignocellulosic raw material aims at obtaining a better penetration and diffusion of the quinone or hydroquinone compound or derivative into the lignocellulosic raw material before the pulp is subjected to cooking, in order to enhance the beneficial effects of the quinone or hydroquinone compound or derivative in the delignification cooking of the lignocellulosic raw material.

Such pretreatment or preparatory pulping of the lignocellulosic raw material may be in accordance with any one or any combination of steps (A), (B) and (C) below:

(A) normal pressure or positive pressure (hydraulically or pneumatically applied) or negative pressure (vacuum) impregnation of the lignocellulosic raw material with an alkaline solution of the quinone or hydroquinone compound or derivative at temperatures from ambient to 130° C., which solution may be the normal cooking liquor or a liquor of another suitable composition which is drained off following impregnation and then replaced with normal cooking liquor; or (B) prolongation of the time normally taken to raise the temperature of the lignocellulosic raw material and cooking liquor containing the quinone or hydroquinone compound or derivative from ambient to maximum cooking temperature of about 180° C.; or (C) maintaining the lignocellulosic raw material and cooking liquor containing the quinone or hydroquinone compound or derivative at a temperature within the range of 100°-130° C. for a period from 15 to 60 minutes and then continuing the normal rate of temperature increase to the maximum cooking temperature of about 180° C. In operating step (A) above, the impregnation period may extend up to 1 hour, before proceeding with the cooking process, which may be conducted at a temperature up to 250° C. but preferably up to 180° C. for a period of 0.5-5 hours; in operating step (B) above, the prolongation period may extend up to 2-3 hours, before proceeding with the cooking process as in step (A) above; and in operating step (C) above, the period taken to reach the temperature of 100°-130° C. may be from 30 minutes to 2 hours, whilst the period of cooking after the 15-60 minutes delay at 100°-130° C. may be from 0.5-5 hours at temperatures as in step (A) above.

In general, the process of the invention may be applied to a wide variety of pulping processes the physical parameters and raw materials of which may be widely varied. For example, the temperature of the pulping process may be varied over a wide range although preferably the process is conducted at a temperature between 50° and 250° C.

In practice, the quinone or hydroquinone compound or derivative is conveniently employed by direct addition to the digester, for example, by addition to the lignocellulosic raw material, in the solid form or as a solution. When the quinone or hydroquinone compound or derivative is employed in the solid form, it is preferably of small particle size, in which case the quinone or hydroquinone compound or derivative may be ground before its addition to the digester, preferably to a size which passes through a 36 mesh British Standard screen.

Surfactant(s) may be employed in the pretreatment liquor or the cooking liquor to assist the dispersion of the quinone or hydroquinone compound or derivative in the pulping liquor.

Some of the advantages of the present invention can be observed by considering the examples set out below. These examples relate to a very limited range of operating conditions which are not necessarily critical for satisfactory performance of the invention. Consequently, it is to be understood that the invention is not limited to the particular process parameters or other features specified in the examples.

The non-limitative practical examples set out below, demonstrate the process of the invention.

In other instances, the examples demonstrate the very much greater effectiveness of the quinone or hydroquinone compounds or derivatives in delignification, when compared with sodium anthraquinone-2-sulfonate, the additive of this invention being present only in minimal amounts to produce an improvement in pulping rate and pulp properties, although the use of larger quantities is permissible even though producing comparatively lesser improvements.

In still other instances, the examples demonstrate the adaptation of the invention to semichemical (NSSC) processing, in which the beneficial effect of anthraquinone or anthrahydroquinone on cooking or delignification rate and pulp properties is demonstrated, especially the exceptional lessening in cooking temperature permitted by the invention.

In all the following examples involving hydroquinones, the hydroquinones were prepared in a way similar to that described in example 2. Before their addition to the digester, air was removed from the digester by three cycles of hydraulic pressure impregnation with nitrogen.

EXAMPLE 1

SODA PULPING WITHOUT ADDITIVE 2000 g. O.D. P.elliottii chips were pulped in either a rotating electrically heated module or a stationary digester with liquor circulation using the following conditions:

| |
|---|
| Liquor to wood ratio 4:1 |
| 25% sodium hydroxide on O.D. wood |
| Schedule: 2 hours to 170° C. + 3 hours at 170° C. |

The cooked chips were defibered with a mechanical disintegrator and then screened using a 0.25 mm Packer screen.

| | |
|---|---|
| Screened yield | 46.1% |
| Total yield | 47.1% |
| Kappa No. | 70 |
| Pulp strengths at 600 Canadian Standard Freeness (c.s.f.) were | |
| Tear index | 13.3 $mNm^2/g$ |
| Breaking length | 5.7 Km |
| Burst index | 3.9 $kPam^2/g$ |

EXAMPLE 2

SODA PULPING WITH ANTHRAHYDROQUINONE 1000 g O.D. P.elliottii chips were pulped under the following conditions:

| |
|---|
| Liquor to wood ratio 4:1 |
| 22% sodium hydroxide on O.D. wood |

0.1% anthrahydroquinone on O.D. wood which was made by dissolving 1000 mg of anthraquinone in 250 ml. water containing 700 mg sodium dithionite and 2.5 g. sodium hydroxide.

| | |
|---|---|
| Schedule: 2 hours to 170° C. + 2 hours at 170° C. | |
| Screened yield | 47.4% |
| Total yield | 50.0% |
| Kappa No. | 66 |
| Pulp strengths at 600 c.s.f. were | |
| Tear index | 16.3 $mNm^2/g$ |
| Breaking length | 7.5 Km |
| Burst index | 5.6 $kPam^2/g$ |

EXAMPLE 3

SODA PULPING WITH 0.1% ANTHRAQUINONE MONOSULPHONATE SODIUM SALT (AMS) (COMPARATIVE EXAMPLE)

400 g. O.D. P.elliottii chips were pulped in a stationary digester with liquor circulation using the following conditions:

| |
|---|
| Liquor to wood ratio 4:1 |
| 19.0% sodium hydroxide on O.D. wood |
| 0.1% anthraquinone monosulphonate sodium salt on O.D. wood |
| Schedule: 2 hours to 170° C. + 3 hours at 170° C. |

| | |
|---|---|
| Screened yield | 47.1% |
| Total yield | 49.9% |
| Kappa No. | 70 |
| Pulp strengths at 600 c.s.f. were | |
| Tear index | 14.6 $mNm^2/g$ |
| Breaking length | 6.2 Km |
| Burst index | 4.6 $kPam^2/g$ |

EXAMPLE 4

KRAFT PULPING 400 g O.D. P.elliottii chips were pulped using the following conditions:

| |
|---|
| Liquor to wood ratio 4:1 |
| 15% active alkali as $Na_2O$ on O.D. wood |
| Schedule: 2 hours to 170° C. + 2 hours at 170° C. |

| | |
|---|---|
| Screened yield | 47.5% |
| Total yield | 48.2% |
| Kappa No. | 42 |
| Pulp strengths at 600 c.s.f. were | |
| Tear index | 17.2 $mNm^2/g$ |
| Breaking length | 8.7 Km |
| Burst index | 6.5 $kPam^2/g$ |

EXAMPLE 5

KRAFT PULPING 400 g O.D. P.radiata chips were pulped using the following conditions:

| |
|---|
| Liquor to wood ratio 4:1 |
| 14% active alkali as $Na_2O$ on O.D. wood |
| Schedule: 2 hours at 170° C. + 2 hours at 170° C. |

| | |
|---|---|
| Screened yield | 48.3 |
| Total yield | 49.4 |
| Kappa No. | 41 |
| Pulp strengths at 600 c.s.f. were | |
| Tear index | 11.9 $mNm^2/g$ |
| Breaking length | 9.7 Km |
| Burst index | 7.8 $kPam^2/g$ |

EXAMPLE 6

SODA PULPING WITH ANTHRAHYDROQUINONE 800 g O.D. P.radiata chips were pulped using the following conditions:

| |
|---|
| Liquor to wood ratio 3.5:1 |
| 22% sodium hydroxide on O.D. wood |
| 0.1% anthrahydroquinone on O.D. wood |
| Schedule: 2 hours to 170° C. + 1¾ hours at 170° C. |

| | |
|---|---|
| Screened yield | 48.3% |
| Total yield | 49.9% |

EXAMPLE 7

SODA PULPING WITH 10-HYDROXY ANTHRONE 800 g. O.D. P.radiata chips were pulped using the following conditions:

| |
|---|
| Liquor to wood ratio 5:1 |
| 22% sodium hydroxide on O.D. wood |
| 0.1% 10-hydroxyanthrone (added as a solid) |
| Schedule: 2 hours to 170° C. + 2 hours at 170° C. |

| | |
|---|---|
| Screened yield | 49.2% |
| Total yield | 50.9% |
| Kappa No. | 46 |
| Pulp strengths at 600 c.s.f. were | |
| Tear index | 13.0 $mNm^2/g$ |
| Breaking length | 8.9 kM |
| Burst index | 7.1 $kPam^2/g$ |

EXAMPLE 8

SODA PULPING WITHOUT ADDITIVE (CONTROL)

20 g. O.D. P. elliotti wood meal was pulped in a rotating electrically heated module using the following conditions:

| |
|---|
| Liquor to wood meal ratio 16.5:1 |
| 330 ml of 1.5 M sodium hydroxide |
| Schedule: x hours at 160° C. |

The wood meal was collected and thoroughly washed. The tabulated results show the change in lignin content and viscosity with changes in schedule time.

| | RESULTS | | | |
|---|---|---|---|---|
| x(hours) | 1 | 2 | 2.5 | 3 |
| Lignin content (%) | 21.8 | 18.2 | 16.6 | 15.0 |
| Viscosity ($cm^3/g$) | 740 | 635 | 650 | 580 |

EXAMPLE 9

SODA PULPING WITH ANTHRAQUINONE MONOSULPHONATE SODIUM SALT (AMS) (COMPARATIVE EXAMPLE)

Using 20 g. O.D. P.elliottii wood meal and the same conditions as in Example 8 but with the addition of 1% AMS the following comparative results were obtained:

| | RESULTS | | | |
|---|---|---|---|---|
| x(hours) | 0.5 | 1.0 | 1.5 | 2.0 |
| Lignin content (%) | 21.2 | 18.6 | 15.7 | 14.4 |
| Viscosity ($cm^3/g$) | 770 | 695 | 665 | 625 |
| Viscosity of the control soda pulp of Example 8 at the same lignin content ($cm^3/g$) | 715 | 640 | 590 | 570 |

EXAMPLE 10

SODA PULPING WITH 2-HYDROXY ANTHRAQUINONE (HOAQ)

Using 20 g. O.D. P.elliottii wood meal and the same conditions as in Example 8 but with the addition of 1% HOAQ the following result was obtained:

| | RESULTS |
|---|---|
| x(hours) | 1.5 |
| Lignin content (%) | 10.8 |
| Viscosity ($cm^3/g$) | 680 |
| Viscosity of the control soda pulp of Example 8 at the same lignin content ($cm^3/g$) | 520 |

EXAMPLE 11

SODA PULPING WITH 1-METHYLAMINO ANTHRAQUINONE (MAAG)

Using 20 g. O.D. P.elliottii wood meal and the same conditions as in Example 8 but with the addition of 1% MAAQ the following result was obtained:

| | RESULT |
|---|---|
| x(hours) | 1.5 |
| Lignin content (%) | 9.8 |
| Viscosity ($cm^3/g$) | 710 |
| Viscosity of the control soda pulp of Example 8 at the same lignin content ($cm^3/g$) | 515 |

EXAMPLE 12

SODA PULPING WITH ALIZARIN (1,2-dihydroxy anthraquinone)

Using 20 g. O.D. P.elliottii wood meal and the same conditions as in Example 8 but with the addition of 1% alizarin the following results were obtained:

| | RESULTS | | | |
|---|---|---|---|---|
| x(hours) | 0.5 | 1.0 | 1.5 | 2.0 |
| Lignin content (%) | 23.7 | 20.4 | 18.0 | 13.6 |
| Viscosity ($cm^3/g$) | 795 | 705 | 665 | 610 |
| Viscosity of the control soda pulp of Example 8 at the same lignin content ($cm^3/g$) | >740 | 690 | 630 | 560 |

EXAMPLE 13

SODA PULPING WITH NAPHTHOQUINONE MONOSULPHONATE SODIUM SALT (NMS)(CONTROL)

Using 20 g. O.D. P.elliottii wood meal and the same conditions as Example 8 with the addition of 1% NMS the following result was obtained:

| | RESULTS |
|---|---|
| x(hours) | 1.5 |
| Lignin content (3) | 15.0 |
| Viscosity ($cm^3/g$) | 670 |
| Viscosity of the control soda pulp of Example 8 at the same lignin content ($cm^3/g$) | 580 |

EXAMPLE 14

SODA PULPING WITH 5-HYDROXY NAPHTHOQUINONE (HONQ)

Using 20 g O.D. P.elliottii wood meal and the same conditions as in Example 8 but with the addition of 1% HONQ the following result was obtained:

| | RESULT |
|---|---|
| x(hours) | 1.5 |
| Lignin content (%) | 13.4 |
| Viscosity ($cm^3/g$) | 670 |
| Viscosity of the control soda pulp of Example 8 at the same lignin content ($cm^3/g$) | 550 |

EXAMPLE 15

NEUTRAL SULPHITE SEMICHEMICAL PULPING 400 g. O.D. P.radiata chips were pulped in a rotating digester using the following conditions:

| | |
|---|---|
| Liquor to wood ratio 4:1 | |
| 22% sodium sulphite and 3% sodium carbonate on O.D. wood | |
| Schedule: 2 hours to 180° C., 3 hours at 180° C. | |
| Yield | 69.0% |
| Kappa No. | 111 |
| Burst index | 5.7 $kPam^2/g$ |
| Tear index | 8.7 $mNm^2/g$ |
| Concora Crush | 275 N |
| Freeness | 600 c.s.f. |

EXAMPLE 16

NEUTRAL SULPHITE SEMICHEMICAL PULPING WITH ANTHRAQUINONE

Conditions as in Example 15 except for the addition of 0.5% anthraquinone on O.D. wood.

| | |
|---|---|
| Yield | 58.4% |
| Kappa No. | 55 |
| Burst index | 7.8 $kPam^2/g$ |
| Tear index | 11.9 $mNm^2/g$ |
| Concora crush | 265 N |
| Freeness | 600 c.s.f. |

EXAMPLE 17

NEUTRAL SULPHITE SEMICHEMICAL PULPING WITH ANTHRAQUINONE

Conditions as in Example 15 except for the addition of 0.1% anthraquinone on O.D. wood and shorter cooking time.

Schedule 2 hours to 180° C., 1.5 hours at 180° C.

Yield 65.4%

The practical examples will be seen to demonstrate exceptionally increased rate of delignification of the lignocellulosic raw material, with consequent superior pulp yield and pulp quality, when compared with corresponding processing in the absence of a hydroquinone compound.

The matter contained in each of the following claims is to be read as part of the general description of the present invention.

We claim:

1. In a process for the delignification of *softwood* lignocellulosic material wherein the *softwood* lignocellulosic material is cooked with a neutral sulphite pulping liquor, the improvement comprising adding to the pulping liquor 0.001% to 10% by weight of an additive compound selected from the group consisting of anthraquinone, phenanthrenequinone, naphthoquinone, anthrone, anthrahydroquinone, naphthohydroquinone, phenanthrahydroquinone, the alkyl-, alkoxy-, hydroxy-, amino-, halo- or carboxy derivatives of said quinones or hydroquinones, the tautomeric form of said additive compounds and mixtures of said additive compounds.

2. A process as claimed in claim 1 wherein the tautomeric form of the additive compound is selected from the group consisting of 10-hydroxyanthrone, 1- and 2-alkyl-10-hydroxyanthrone, 1- and 2-amino-10-hydroxyanthrone, 1- and 2-hydroxy-10hydroxyanthrone, 1- and 2-halo-10-hydroxyanthrone and mixtures thereof.

3. A process as claimed in claim 1 wherein the additive compound is selected from the group consisting of 9,10-anthrahydroquinone and 1- and 2-alkyl-9,10-anthrahydroquinone.

4. A process as claimed in claim 1 wherein the additive compound is pre-mixed with the cooking liquor and the *softwood* lignocellulosic raw material before introduction to a digester for cooking.

5. A process as claimed in claim 1 wherein the additive compound is added to the cooking liquor and to the *softwood* lignocellulosic raw material in the digester.

6. A process as claimed in claim 1 wherein the hydroquinone compound is generated in situ during cooking by reaction of the corresponding quinone compound with a reducing agent.

7. A process as claimed in claim 6 wherein the reducing agent is an inorganic agent selected from the group consisting of sodium dithionite, zinc dithionite, sodium borohydride, zinc powder and sodium hydroxide.

8. A process as claimed in claim 6 wherein the reducing agent is an organic agent selected from the group consisting of glucose, xylose, mannose, sucrose, cellobiose, maltose, raffinose, starch, xylan, amines, alkanolamines, aldehydes and spent cooking liquor.

9. A process as claimed in claim 6 wherein the quinone compound is 9,10-anthraquinone and the reducing agent is sodium dithionite.

10. A process as claimed in claim 6 wherein increments of the reducing agent are periodically added during cooking in order to maintain a sufficient amount of the hydroquinone compound in the cooking liquor.

11. A process as claimed in claim 1 wherein the cooking occurs at a temperature in the range of 50° C. to 250° C.; and the cooking period is in the range of 480 minutes to 0.5 minutes.

12. A process as claimed in claim 11 wherein the cooking temperature and the cooking period consists of a first stage of 30 minutes to 120 minutes in reaching a temperature of 100° to 130° C.; a second stage of 15 minutes to 50 minutes held at the temperature of 100° to 130° C.; and a third stage of 30 minutes to 300 minutes at a temperature from the 130° C. to a maximum temperature of 180° C.

13. A process as claimed in claim 1 wherein the *softwood* lignocellulosic material is subjected to a pretreatment in a soaking liquor containing a soluble quinone or hydroquinone compound for a preliminary impregnation of said *softwood* lignocellulosic material with said compound before the introduction of the *softwood* lignocellulosic raw material into a digester for delignification.

[14. In a process for the delignification of lignocellulosic material wherein the lignocellulosic material is cooked with an alkaline pulping liquor, the improvement comprising adding to the pulping liquor 0.001% to 10% by weight of a hydroquinone selected from the group consisting of 9,10-anthrahydroquinone, phenanthrahydroquinone, the alkyl-, alkoxy-, halo-, hydroxy-, amino-, or carboxy-derivatives of said hydroquinones and the tautomeric form of said hydroquinones and mixtures thereof.]

[15. A process as claimed in claim 14 wherein the additive compound is pre-mixed with the cooking liquor and the lignocellulosic raw material before addition to a digester for cooking.]

[16. A process as claimed in claim 14 wherein the additive compound is added directly to the cooking liquor and to the lignocellulosic raw material during the cooking.]

[17. A process as claimed in claim 14 wherein the hydroquinone compound is generated in situ by reaction of the corresponding quinone compound with a reducing agent.]

[18. A process as claimed in claim 17 wherein the reducing agent is an inorganic agent selected from the group consisting of sodium dithionite, zinc dithionite, sodium borohydride, zinc powder and sodium hydroxide.]

[19. A process as defined in claim 18 wherein increments of the reducing agent are periodically added during cooking in order to maintain a sufficient amount of the hydroquinone compound in the cooking liquor.

[20. A process as claimed in claim 17 wherein the reducing agent is an organic agent selected from the group consisting of glucose, xylose, mannose, sucrose, cellobiose, maltose, raffinose, starch, xylan, amines alkanolamines, aldehydes and spent cooking liquor.]

[21. A process as claimed in claim 14 wherein the cooking occurs at a temperature in the range of 50° C. to 250° C.; and the cooking period in in the range of 480 minutes to 0.5 minutes.]

[22. A process as claimed in claim 14 wherein the lignocellulosic raw material is subjected to pretreatment in a soaking liquor containing a soluble hydroquinone compound for a preliminary impregnation of the lignocellulosic raw material with said compound before the introduction of the lignocellulosic material into a digester for delignification.]

[23. A process as claimed in claim 14 wherein the hydroquinone compound is selected from the group consisting of 1- and 2-hydroxy-9,10-anthrahydroquinone.]

[24. A process as claimed in claim 14 wherein the hydroquinone compound is selected from the group consisting of 1- and 2-alkyl-9,10-anthrahydroquinone and mixtures thereof.]

[25. A process as claimed in claim 14 wherein the amount of the hydroquinone compound is in the range of 0.001 to 5% by weight based on the lignocellulosic material; the cooking temperature is in the range of 130° C. to 180° C.; and the cooking period is in the range of 480 minutes to 0.5 minute.]

* * * * *